United States Patent [19]

Staney

[11] Patent Number: 5,276,972

[45] Date of Patent: Jan. 11, 1994

[54] SATELLITE LOCATOR

[75] Inventor: Michael W. Staney, Jensen Beach, Fla.

[73] Assignee: Plate Array Technologies, Ft. Pierce, Fla.

[21] Appl. No.: 895,889

[22] Filed: Jun. 9, 1992

[51] Int. Cl.⁵ .............................................. G01C 1/00
[52] U.S. Cl. ......................................... 33/271; 33/268; 33/273; 33/1 SC
[58] Field of Search ................. 33/271, 268, 272, 273, 33/274, 281, 283, 1 T, 1 SC, 1 DD, 343/757, 760, 882, 894; 342/359

[56] References Cited

U.S. PATENT DOCUMENTS

| | | | |
|---|---|---|---|
| 674,324 | 5/1901 | Trommlitz | 33/272 |
| 2,189,790 | 2/1940 | Gardner et al. | 33/268 |
| 2,448,965 | 9/1948 | Drayer | 33/281 |
| 4,138,826 | 2/1979 | Inge | 33/268 |
| 4,236,313 | 12/1980 | Griffin, Jr. | 33/268 |

Primary Examiner—William A. Cuchlinski, Jr.
Assistant Examiner—C. W. Fulton
Attorney, Agent, or Firm—Cushman, Darby & Cushman

[57] ABSTRACT

An apparatus which can be carried to a field sight to locate current and future positions of geosynchronous satellites orbiting the equator in the Clark Belt Altitude. The apparatus corrects the error in viewing angle by providing corrections in longitude and latitude deviations caused by the location of the antenna. The apparatus will provide the user a means of accurately locating a satellite with regard to existing terrain and the obstacles which would interfere with signals between the ground position and the satellite.

25 Claims, 2 Drawing Sheets

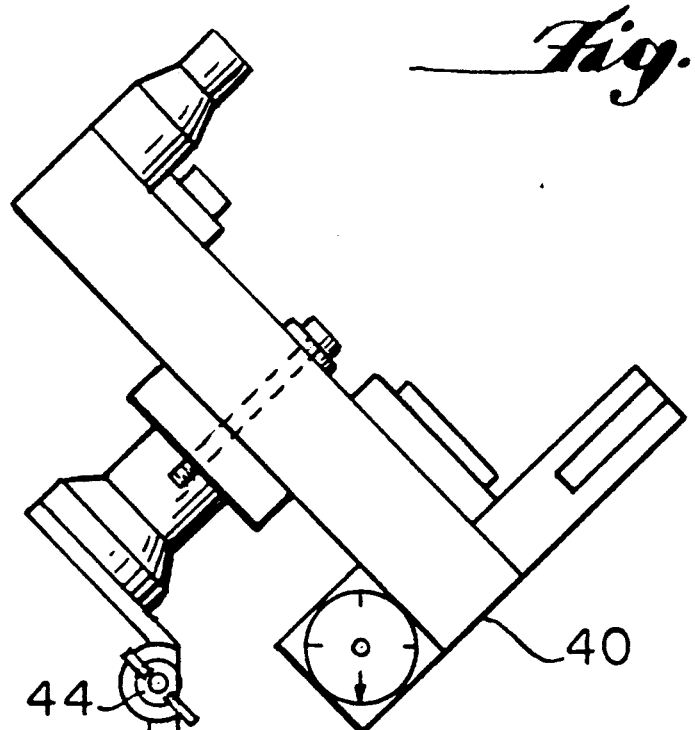
Fig. 1.
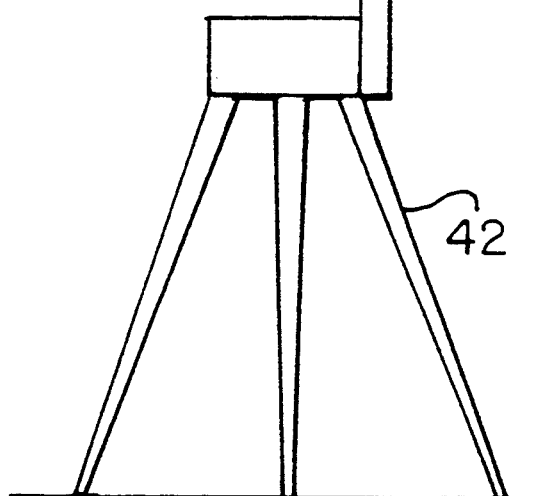
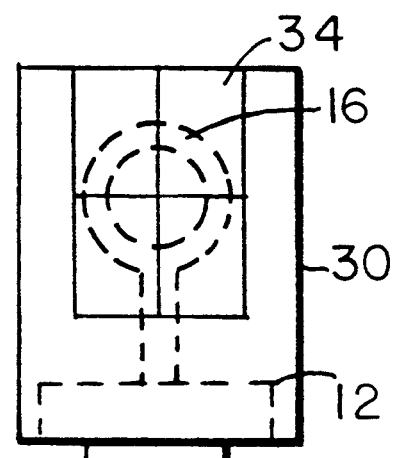
Fig. 4.
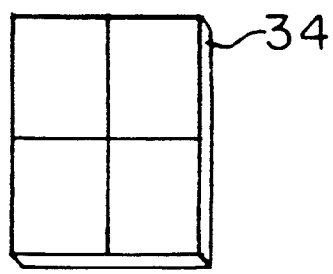
Fig. 5.

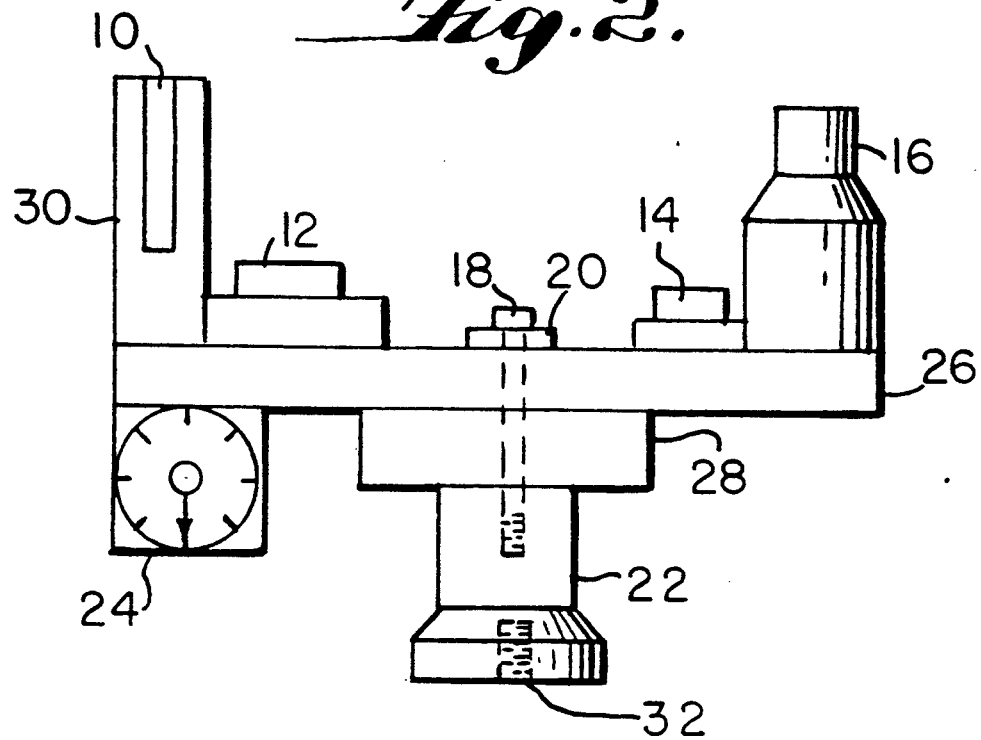
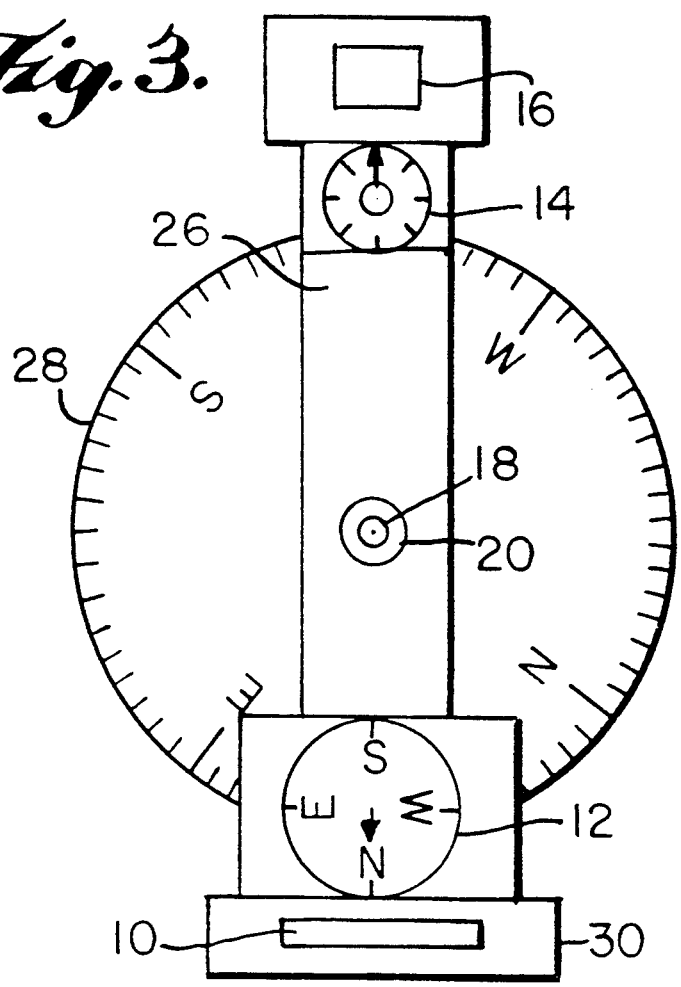

SATELLITE LOCATOR

BACKGROUND OF THE INVENTION

1. Field of the Invention

The present invention relates to an apparatus which is used when installing a satellite dish or array on a building or on the ground.

2. Background Information

When deciding the location of a satellite dish or array, the installer needs to locate the desired satellite which will communicate with the array. The installer needs to determine that no obstacles will interfere with the signals being sent to and from the satellite. The apparatus of this invention evolved from a need to possess an instrument that can be carried to the field sight to locate current and future positions of geosynchronous spacecraft/satellite orbiting the equator in the Clark Belt Altitude.

Usually large communication dish antennas are needed for the purpose of locating satellite signals and the site feasibility at a specific location. These communication dishes are bulky and awkward to work with. A device was needed which is easy to setup and operate but does not sacrifice accuracy and reliability of locating satellite signals.

SUMMARY OF THE INVENTION

Not only is this invention easy to handle and setup, but it is accurate in locating specific satellites. Previous satellite locators failed to take into consideration the error in the viewing angle when viewing prospective sight positions. The present invention corrects this error in the viewing angle by providing a line of sight calculation which includes the offset angle in a real time line segment that shifts the viewing angle in the field of view. Since previous instruments did not take this error correction into consideration when projecting possible locations, this error provided inaccuracy to sight location determination because of omission of this shift. The present invention will provide the user a means to accurately locate the satellites with regard to existing terrain and the obstacles which may exist between the position of the array and the desired satellite.

BRIEF DESCRIPTION OF THE DRAWINGS

FIG. 1 is a satellite locator mounted on a tripod.
FIG. 2 is a side view of satellite locator.
FIG. 3 is a top view of satellite locator.
FIG. 4 is a front view of satellite locator.
FIG. 5 is a Declination Insert which is inserted in a satellite locator.

DETAILED DESCRIPTION OF THE INVENTION

Referring to FIG. 1, a satellite locator 40 is attached to a conventional tripod 42 or stand. The tripod or stand should have an adjustable bracket 44 which allows the satellite locator to be moved from a horizontal to a vertical position or any angular degree between those two positions.

Referring to FIG. 2, a satellite locator is supported by a base 22 which has a threaded screw hole 32 on the bottom side in order to attach to the tripod or stand. A long bolt 18 which has a distal screw end attaches a transparent elevation bar 26 and a compass dial 28 to the top side of base 22. The compass dial has 360 degree markings and also markings for North, South, East and West. On a first end of the elevation bar is attached a vertical level 24, a declination insert holder 30 and a compass 12. On a second end of the elevation bar 26 is a view window 16 and a horizontal level 14.

The horizontal level 14 has an arrow marking pointing toward the view window. The elevation bar has a longitudinal line parallel to the arrow marking which runs from the horizontal level 14 toward the compass 12. Declination insert 34 (not shown) is inserted into the declination insert holder slot 10 which is located in the declination insert holder 30.

To use the satellite locator, place the stand firmly on the ground or surface which the satellite dish will be mounted. Level the satellite locator by using the adjuster on the tripod or stand. The vertical level and the horizontal level will assist the operator in getting the elevation bar 26 level.

Referring to FIG. 3, the operator now views the satellite locator from the top. The operator aligns the elevation bar marking, the arrow on the horizontal level and the compass arrow so that the horizontal level arrow points to magnetic South. Adjust the compass dial 28 so that the 180 degree marking (South) points to magnetic South. An error is introduced at this point because of the difference between the earth's magnetic field and true South readings. This error is corrected by adding or subtracting from the compass dial a magnetic deviation, which depends on the location on earth of the satellite locator. This information would be supplied to the operator for the location, i.e. nearest city, in which the satellite locator is being used. Turn the elevation bar relative to the compass dial by the correct number of degrees. The new readings now reflect true South or North locations depending on which side of the equatorial line the satellite locator is being used. This last step may not be necessary if the movement for azimuth degrees, which is performed in a later step, includes this magnetic deviation in the azimuth degree calculations.

Next the user must look at a table which gives the latitude of the sight location. The elevation bar is moved in the vertical direction so that the vertical locator angel in degrees corresponds with the area latitude in degrees. Referring to the chart provided for declination for that latitude, the proper insert is selected and inserted at this point. Next rotate the elevation bar to the azimuthal degrees for that particular satellite's position to be viewed. The chart may provide this location with the correction for magnetic variation. If this is the case then add or subtract the variation from the degrees give in the chart from the azimuthal degrees given.

The insert, as shown in FIG. 5, provides the change of viewing angle in the view window to give the viewer the correct position of line of sight. The viewing angle varies with the change in latitude as does the insert for that latitude. This change can vary from zero at the equator to seven degrees as the latitude changes from the equator's position north or south.

Referring to FIG. 4, the operator looks through the inset crosshairs aligning the operator's eye with the view window. The correct position of the satellite is now located. Also, any obstacles in this lien of sight will be displayed at this time.

The instrument actually mimics what a parabolic antenna would see if positioned at this point. Elevation of the sight or repositioning of the sight is necessary in order to clear obstacles in the line of sight to provide an array location with maximum reception.

It should be understood that the foregoing relates to only a preferred embodiment of the present invention, and that it is intended to cover all changes and modifications of the embodiment of the invention herein used for the purposes of disclosure, which do not institute departures from the spirit and scope of the invention.

What is claimed is:

1. A satellite locator apparatus for positioning an antenna comprising:
   a base member which attaches to a stand;
   a compass dial;
   an elevation bar;
   a bolt to connect said base member to said compass dial and to said elevation bar which allows said compass dial and elevation bar to rotate in an angular direction;
   a vertical level attached to a first end of said elevation bar;
   a declination holder attached to said first end of said elevation bar;
   a declination insert to insert into said declination holder;
   a compass, which is attached to said first end of elevation bar, located between said declination holder and said bolt;
   a view window attached to a second end of elevation bar;
   a horizontal level, which is attached to said second end of said elevation bar, located between said view window and said bolt.

2. A satellite locator apparatus as claimed in claim 1, wherein said stand is a tripod.

3. A satellite locator apparatus as claimed in claim 1, wherein said compass dial has markings for 360 degrees.

4. A satellite locator apparatus as claimed in claim 3, wherein said markings on said compass dial include North at 0°, East at 90°, South at 180° and West at 270°.

5. A satellite locator apparatus as claimed in claim 1, wherein said elevation bar is transparent.

6. A satellite locator apparatus as claimed in claim 1, wherein said elevation bar has a longitudinal line running from said compass to said horizontal level.

7. A satellite locator apparatus as claimed in claim I, wherein said bolt has a smooth surface when passing through said elevation bar and said compass dial and is threaded at said base member.

8. A satellite locator apparatus as claimed in claim 1, wherein said view window is circular.

9. A satellite locator apparatus as claimed in claim 1, wherein said horizontal level is a bubble level.

10. A satellite locator apparatus as claimed in claim 1, wherein said declination insert has cross hairs which are positioned differently for each site latitude.

11. A satellite locator apparatus for positioning an antenna comprising:
    a base means for attaching said apparatus to a stand;
    a dial means for determining a azimuthal direction;
    a vertical level means for determining a vertical position;
    a horizontal level means for determining a horizontal position;
    a declination means for determining a declination of a desired object;
    a direction means for determining magnetic North;
    a viewer means for locating said desired object;
    a bar means for supporting said vertical level means, said horizontal level means, said declination means, said viewer means and said direction means;
    an attaching means for attaching said bar means, said dial means and said base means.

12. A satellite locator apparatus as claimed in claim 11, wherein said stand is a tripod.

13. A satellite locator apparatus as claimed in claim 11, wherein said dial means has angular markings in degrees.

14. A satellite locator apparatus as claimed in claim 11, wherein said horizontal level means is a bubble level.

15. A satellite locator apparatus as claimed in claim 11, wherein vertical level means has angular markings in degrees.

16. A satellite locator apparatus as claimed in claim 11, wherein said declination means has cross hairs which are determined by each site's specific latitude.

17. A satellite locator apparatus as claimed in claim 11, wherein direction means is a compass.

18. A satellite locator apparatus as claimed in claim 11, wherein said bar means is transparent.

19. A satellite locator apparatus as claimed in claim 11, wherein attaching means is a bolt which has a threaded distal end to attach to said base means.

20. A method for locating a satellite in order to position an antenna comprising the steps of:
    leveling a satellite locator;
    aligning a marking on an elevation bar with magnetic South direction;
    adjusting a dial to be lined up with said markings on said elevation bar;
    moving said elevation bar in a vertical angular direction to a desired angle;
    moving said elevation bar in a horizontal angular direction to a desired angular position;
    inserting proper declination insert into a declination holder;
    checking line of sight for said antenna by looking through a view window and said declination insert.

21. A method of locating a satellite as claimed in claim 20, wherein aligning said marking on said elevation bar with magnetic South direction by using a compass.

22. A method of locating a satellite as claimed in claim 20, wherein sad vertical angular direction and said horizontal angular direction is determined by a table based on location of said antenna which has angular directions for a desired satellite.

23. A method of locating a satellite as claimed in claim 20, wherein moving said elevation bar in said vertical angular direction is done with a level with angular markings.

24. A method of locating a satellite as claimed in claim 20, wherein moving said elevation bar in said horizontal angular direction is done with said dial with angular markings.

25. A method of locating a satellite as claimed in claim 20, wherein declination insert is unique for each site's latitude.

* * * * *